United States Patent Office 3,792,126
Patented Feb. 12, 1974

3,792,126
PROCESS FOR POLYMERIZING VINYL AROMATIC MONOMERS USING NEW RADICAL-TYPE CATALYSTS
Lino Vio, Mazeres-Lezons par Gelos, France, assignor to Societe Anonyme dite: Societe Nationale des Petroles d'Aquitaine, Courbevoie, France
No Drawing. Filed June 21, 1971, Ser. No. 155,214
Claims priority, application France, June 26, 1970, 7023800
Int. Cl. C08f 7/04, 7/06, 1/74
U.S. Cl. 260—880 R
15 Claims

ABSTRACT OF THE DISCLOSURE

The present invention concerns a process for polymerizing monomers and particularly styrene by using new catalysts.

The invention is characterized by the fact that organic silicon derivatives, with a higher temperature stability than the catalysts normally used, are used as catalysts.

The use of these new organic silicon derivatives as catalysts particularly in polymerizing styrene ensures a significant reduction in the residual monomer content of the polystyrene product, and thus allows such a product to be used in contact with foodstuffs.

---

The present invention concerns the polymerization of monomers polymerizable by radical-type catalysis, and vinyl monomers in particular, using new catalysts. The invention preferably applies to the polymerization of vinyl-aromatic monomers such as styrene.

Vinyl-aromatic monomers such as styrene are frequently polymerized, either in mass or in aqueous suspension, by thermal or catalytic polymerization, producing polymers with molecular weights and residual monomer contents that vary depending on the conditions of the reaction, such as the temperature or duration of polymerization, and the concentration of catalyst or catalysts.

Polystyrenes containing significant proportions of residual monomer and/or polymers with low molecular weight usually have unfavorable mechanical properties. In addition, certain uses are ruled out for such polystyrene products; polystyrenes with too high a residual monomer content may not be used in contact with foodstuffs. Known means exist of lowering the level of residual monomer, for instance by removing gas at the end of polymerization, but the technique requires special, often expensive equipment.

Polymerization conditions therefore have to be fixed in such a way as to ensure that the residual monomer content is as low as possible. Existing techniques, however, in particular for mass polymerization of styrene, do not provide the required result at sufficient speed for industrial purposes. Mass polymerization of styrene is usually carried out at temperatures above 150° C., by thermal polymerization, whereas it would be better to combine thermal polymerization and catalytic polymerization so as to raise the speed of polymerization and reduce the residual monomer content. The catalysts normally used, however, have too short a half-life at 150° C. to allow them to be used at or above this temperature. Mass styrene polymerization therefore at the present has to be completed solely by thermal polymerization, which always involves drawbacks. When polymerization is halted after a period compatible with industrial operations, the residual monomer rate is still too high for many polystyrene applications. If thermal polymerization is continued long enough to obtain a low residual monomer level, the mechanical properties of the polystyrenes obtained are still rather unsatisfactory, because keeping the polymer at high temperatures for too long a period causes deterioration of the resulting product.

The process according to the present invention removes these drawbacks, as, by using a procedure involving combining thermal polymerization and catalytic polymerization, polymers with low residual monomer content are obtained fast enough for industrial production.

The process consists of polymerizing or copolymerizing monomers polymerizable by radical-type catalysis, such as vinyl compounds, preferably vinyl-aromatic compounds, using new radical catalysts with higher stability than existing catalysts. The invention also concerns conducting the polymerization, at least partly, using new catalysts and at fairly high temperatures, usually above 140° C.

The process applies in particular to the polymerization and copolymerization of styrene. Styrene, for instance, may be copolymerized with the following monomers: acrylonitrile, methacrylonitrile, alkyl methacrylates and acrylates, alkyl-styrene, vinyl chloride, and butadiene. Styrene may also contain, the dessolved state, a rubbery polymer such as butadiene and isoprene polymers and copolymers.

Vinyl-aromatic compounds that can also be polymerized using the process according to the present invention include alkyl-styrenes, vinyl-naphthalene and chloro- and bromo-styrenes.

The catalysts of higher stability used within the framework of the present invention are characterized by the fact that they contain the following group:

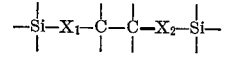

where $X_1$ and $X_2$ are atoms of a divalent metalloid such as oxygen or sulphur, or substitution trivalent such as a substitution nitrogen atom.

Preference is given to catalysts in which $X_1$ and $X_2$ are similar, and represent an oxygen atom, and particularly those corresponding to the following formulae:

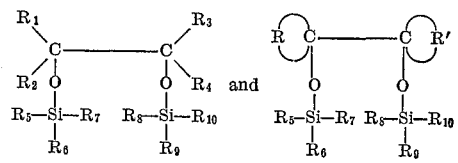

where $R_1$, $R_2$, $R_3$, $R_4$, $R_5$, $R_6$, $R_7$, $R_8$, $R_9$ and $R_{10}$ are any monovalent organic or hydrogen groups, while R and R' are any divalent organic groups. In the commonest catalysts these organic groups are aromatic, aliphatic or arylaliphatic groups.

In the most frequent cases, catalysts that can be used industrially can be represented more simply by the following two formulae:

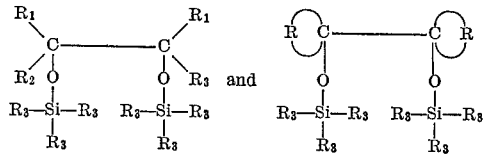

where $R_1$, $R_2$ and $R_3$ could be, for instance, alkyl groups such as $CH_3$, or aromatic groups such as $C_6H_5$, $CH_3$—O—$C_6H_4$, N≡C—$C_6H_4$, $CH_3$—$C_6H_4$, $NO_2$—$C_6H_4$, $C_{10}H_7$(naphthyl) or $C_6H_5$, $C_6H_4$, or hydrogen atoms, while the group

may, for example, have the following formula:

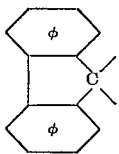

The proportion of catalysts in relation to the monomer varies depending on the speed fo polymerization required; it is usually between $10^{-4}$ and $10^{-2}$ active groups per mole of monomer. Expressed in weight, the catalyst content may be between 0.01 and 1%, and particularly between 0.02 and 0.4%.

The new catalysts may be used alone or in combination with other catalysts, and particularly with catalysts that are active at much lower temperatures than 150° C. These catalysts include t-butyl perbenzoate, t-butyl peracetate, di-t-butyl peroxide, dicumyl peroxide, t-butyl perisononanoate, and benzoyl peroxide.

The new catalysts can be used to polymerize vinyl-aromatic monomers in mass and in aqueous suspension, and primarily for polymerization and copolymerization, grafted or not, of styrene.

According to one embodiment of the invention, the styrene mass is polymerized, if necessary in the presence of other monomers such as acrylonitrile, and/or in the presence of a rubbery polymer such as polybutadiene.

The styrene may be heated, for instance in one or more enclosed reactors, arranged in series or parallel, equipped with a stirrer, double casing and, if necessary, a condenser, until a prepolymer is obtained, in the form of a viscous liquid, the conversion rate usually being between 25 and 65%. The prepolymerization temperature is usually between 80 and 120° C., and preferably 100 and 115° C. The prepolymer may then be transferred to thin metal containers of fairly small capacity, and polymerization is completed in a heated oven. The prepolymer may also be transferred to the top of a vertical tower, heated to a temperature that increases from top to bottom. When polymerization is completed in an oven, this should be kept at a uniform temperature of between 140 and 250° C., although it is also possible to raise the temperature gradually from approximately 140° C. to 180° C. or more.

When polymerization is completed in a tower, the temperature at the top of the column is usually between 100 and 150° C., and it increases further down, reaching between 180 and 250° C. at the bottom.

The new catalysts according to the present invention may be added, along with other additives such as antioxidant agents, either before prepolymerization or before the second stage of polymerization.

The monomer mass may also be polymerized without preliminary prepolymerization, and the polymerization reactors raised immediately to temperatures of between 140 and 250° C., and preferably 170 and 220° C.

According to another recommended embodiment of the process according to the invention, the styrene may be polymerized or copolymerized in aqueous suspension. For instance, the styrene is placed in an aqueous solution containing one or more suspension agents such as calcium phosphate, polyvinyl alcohol, starch, cellulose derivatives, sulphonates, sulphosuccinates or others, and then the new catalysts according to the invention are added, usually in combination with other catalysts which are active at temperatures of between 80 and 120° C. These catalysts include benzoyl peroxide, t-butyl perbenzoate, t-butyl peracetate, dicumyl peroxide and t-butyl peroxide. The suspension, which is at a temperature of around 50° C., is then raised to the point at which polymerization begins, namely temperatures of between 80 and 120° C., depending on the types of catalysts used. This temperature rise may last between 30 minutes and 90 minutes. After the start of polymerization, the temperature is again raised for a period of between 2½ and 4 hours, either gradually, or by successive temperature stages, and polymerization is completed by keeping the suspension at a fixed temperature of between 130 and 160° C., for a period of between 30 minutes and 4 hours.

These two processes may also be combined, beginning with mass polymerization with stirring, and ending with suspension polymerization. Polymerizing of the mass to start with is necessary in any case when styrene is being polymerized in the presence of a polymer such as polybutadiene, if satisfactory results are to be obtained.

The following examples illustrate and show the benefits of the invention, which, however, is not confined to them.

EXAMPLE 1

0.3 part weight of catalyst with the following formula is dissolved in 100 parts weight of styrene:

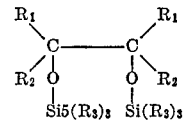

where $R_1$ and $R_2=C_6H_5$, and $R_3=CH_3$.

The container is drained, then heated to 106° C. for 7 hours, after which it is raised to 200° C., and held at this temperature for 7 hours. The polystyrene obtained contains 1% residual monomer.

Exactly the same mass polymerization is repeated, but this time without catalyst; the residual monomer content of the polystyrene obtained is 2%.

EXAMPLE 2

0.3 part weight of the catalyst according to Example 1 is dissolved in 100 parts weight of styrene, and the mixture is heated to 100° C. for 7 hours, then to 185° C. for 7 hours. The residual monomer content of the polystyrene obtained is 0.9%.

The operation is then repeated without the catalyst; the residual monomer content of the polystyrene obtained is 2.4%.

EXAMPLE 3

0.3 part weight of the catalyst according to Example 1 is dissolved in 100 parts weight of styrene. The reaction mixture is then heated to 106° C. for 7 hours, and polymerization is completed at 215° C. for 7 hours.

The residual monomer content of the polystyrene obtained is 0.65%.

The same operation is repeated, without the catalyst; the residual monomer content of the polystyrene obtained is 1.3%.

EXAMPLE 4

0.3 part weight of the catalyst according to Example 1 is dissolved in 100 parts weight of styrene. The reaction mixture is then heated to 106° C. for 7 hours, and then to 160° C. for 7 hours.

The residual monomer content of the polystyrene is 2%, while without catalyst it is 4.3%.

EXAMPLE 5

0.3 part weight of the catalyst according to Example 1 is dissolved in 100 parts weight of styrene. After 7 hours at 106° C., polymerization is completed at 150° C. for 7 hours. The residual monomer content of the polystyrene obtained is 4%.

The same operation is repeated without catalyst; the residual monomer content of the polystyrene is 6.5%.

EXAMPLE 6

0.3 part weight of the catalyst according to Example 1 is dissolved in 100 parts weight of styrene. The reactor is drained with nitrogen, and prepolymerization is carried out for 7 hours at 106° C. The temperature is then raised to 140° C. in 45 minutes, then raised gradually to 230° C., at a rate of 12° C. an hour. The residual monomer content of the polystyrene obtained is 0.4%, whereas when the same polymerization is carried out without catalyst the residual monomer content is 1.7%.

EXAMPLE 7

0.3 part weight of the catalyst according to Example 1 is dissolved in 100 parts weight of styrene. The reactor is drained and prepolymerized for 7 hours at 106° C. The temperature is then raised to 140° C. in 45 minutes, and held at this level for 45 minutes, after which it is gradually raised to 230° C., at a rate of 18° C. an hour.

The residual monomer content of the polystyrene obtained is 0.7%.

The same operation is repeated without catalyst; the residual monomer content is 2%.

EXAMPLE 8

Prepolymerization is carried out at 106° C. in a reactor equipped with an efficient stirrer and containing 120 liters of styrene, for an average period of 12 hours. The conversion rate is set at approximately 35%, and 10 kg./hour of prepolymer are drawn off continuously, and fed into a polymerization tower, with the addition of 0.06% weight of the catalyst according to Example 1. The tower is heated by means of a double casing and worms, inside which oil circulates. The double casing is divided into six separate zones, which can be kept at temperatures ranging from 140° C. at the top of the tower to 222 to 220° C. at the bottom, with the intervening zones at approximately 160, 175, 185 and 195° C.

The average duration spent in the tower is 10 to 12 hours.

The residual styrene content is 0.35% with the catalyst and 0.65% when the test is performed without catalyst.

EXAMPLE 9

Styrene in an aqueous suspension is polymerized in the presence of 0.08% weight of t-butyl perbenzoate and 0.1% weight of the catalyst according to Example 1. The temperature is raised from 50 to 115° C. in 1 hr. 15 min., and then from 115 to 140° C. in 3 hr. and 15 min. The suspension is then kept at 140° C. for an hour.

The residual monomer content of the polystyrene obtained is 0.75%, whereas when polymerization is repeated without the catalyst according to Example 1, the residual monomer content of the polystyrene obtained is 3.5%.

EXAMPLES 10 TO 13

Without any preliminary prepolymerization, the styrene mass is polymerized at 150° C. for 7 hours, in the presence of 0.3% weight of catalyst with the following formula:

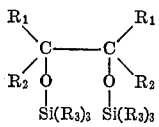

The residual monomer contents obviously differ for the various catalysts used. The following results are obtained:

Content, percent
(10)—$R_1=C_6H_5$, $R_2=C_6H_5$, $R_3=CH_3$ _____ 5
(11)—$R_1=C_6H_5$, $R_2=C_6H_5$, $R_3=C_6H_5$ _____ 6.5
(12)—$R_1=C_{10}H_7$ (naphthyl), $R_2=C_6H_5$, $R_3=CH_3$ __ 4.5
(13)—$R_1$=para($OCH_3$)—$C_6H_5$, $R_2=C_6H_5$,
$R_3=CH_3$ _____ 1.7

EXAMPLE 14

0.1 part weight of catalyst with the following formula is dissolved in 100 parts weight of styrene:

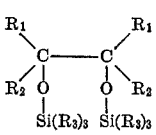

where $R_1=CH_3$, $R_2=C_6H_5$, $R_3=CH_3$.

The reactor is drained, then heated to 106° C. for 8 hours, after which it is raised to 140° C., then gradually raised to 230° C., at the rate of 12° C. an hour.

After one hour (i.e., at 152° C.), the residual monomer content obtained is 31%; after 3 hours (i.e., at 176° C.) it is 7%, after 5 hours (i.e., 200° C.) it is 2.1%, and after 7½ hours (i.e., at 230° C.) it is 0.9%.

When the same operation is performed without catalyst, the following results are obtained: after one hour 30% residual monomer, after 3 hours 9%, after 5 hours 2.3% and after 7½ hours 1.8%.

EXAMPLE 15

The operation according to Example 14 is repeated, but using a different catalyst, which has the following formula:

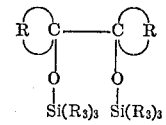

where

is

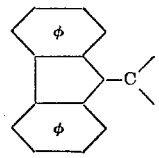

and $R_3=CH_3$

After one hour the residual monomer content of the polystyrene obtained is 13.5%; after 3 hours it is 5.7%, after 5 hours 1.9% and after 7½ hours 1.1%.

EXAMPLE 16

The operation according to Example 14 is repeated, but using a different catalyst, which has the following formula:

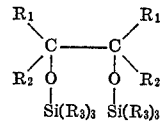

where $R_1=C_6H_5$, $R_2=H$, $R_3=CH_3$.

After one hour (i.e., at 152° C.), 32% monomer remains; after 3 hours (i.e., at 176° C.), the content is 7.2%; after 5 hours (200° C.) it is 1.8%, and after 7½ hours (230° C.) it is reduced to 1.3%.

EXAMPLE 17

The operation according to Example 14 is repeated, but using a different catalyst, which has the following formula:

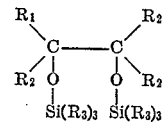

where $R_1=C_6H_5$, $R_2=C_6H_5$, $R_3=CH_3$.

After one hour there remains 24.6% monomer, after 3 hours 5.8%, after 5 hours 1.4% and after 7½ hours 0.9%.

What is claimed is:
1. A process for the catalytic polymerization of a vinyl aromatic monomer which comprises polymerizing said vinyl aromatic monomer at a temperature between 80 and 250° C. in the presence of about 0.01% to 1% by weight based on the weight of said vinyl aromatic monomer of a catalyst of the formula:

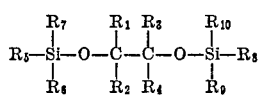

wherein $R_1$ to $R_{10}$ are monovalent organic radicals or hydrogen.

2. A process according to claim 1, wherein said vinyl aromatic monomer is a member selected from the group consisting of styrene, vinyl naphthalene, chlorostyrene and bromostyrene.

3. A process according to claim 1 wherein said catalyst has the following formula:

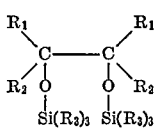

where $R_1$, $R_2$ and $R_3$ are hydrogen, aliphatic, aromatic or arylaliphatic groups.

4. A process according to claim 3, wherein said $R_1$, $R_2$ and $R_3$ are selected from the following groups: $CH_3$, $C_6H_5$, $CH_3$—O—$C_6H_4$, N≡C—$C_6H_4$, $CH_3$—$C_6H_4$, $NO_2C_6H_4$, $C_{10}H_7$(naphthyl), $C_6H_5$—$C_6H_4$ and hydrogen.

5. A process according to claim 1, wherein the catalyst has the following formula:

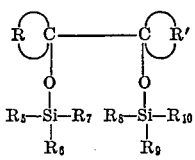

where R and R' are divalent organic groups and $R_5$, $R_6$, $R_7$, $R_8$, $R_9$ and $R_{10}$ are monovalent organic groups or hydrogen.

6. A process according to claim 5, wherein the catalyst has the following formula:

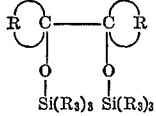

where R is a divalent aliphatic or aryl-aliphatic or aromatic group, and $R_3$ is a monovalent aliphatic or aryl-aliphatic group or hydrogen.

7. A process according to claim 6, characterized by the fact that the catalyst has the following formula:

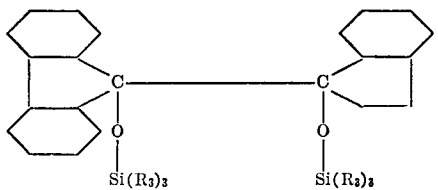

where $R_3$ is $CH_3$ or $C_6H_5$.

8. A process according to claim 1 wherein said vinyl aromatic monomer is polymerized in the presence of a monomer selected from the group consisting of acrylonitrile, methacrylonitrile, alkyl methacrylates and acrylates, alkyl-styrene, vinyl chloride, and butadiene.

9. A process according to claim 8, characterized by the fact that the styrene is polymerized in the presence of acrylonitrile.

10. A process according to claim 2, characterized by the fact that the styrene is polymerized in the presence of a polymer selected from the group consisting of polybutadiene and polyisoprene.

11. A process according to claim 10, characterized by the fact that the styrene is polymerized in the presence of polybutadiene.

12. A process according to claim 1, characterized by the fact that the catalyst is used in combinations with other catalysts which are active at temperatures of between 80 and 120° C., selected from the group consisting of t-butyl peracetate, benzoyl peroxide, di-t-butyl peroxide, t-butyl perbenzoate, dicumyl peroxide and t-butyl perisononoate.

13. A process according to claim 1, characterized by the fact that polymerization is completed at temperatures above 140° C.

14. A process according to claim 2, characterized by the fact that polymerization is a mass polymerization.

15. A process according to claim 2, characterized by the fact that polymerization takes place in an aqueous suspension.

References Cited

UNITED STATES PATENTS

| | | | |
|---|---|---|---|
| 3,227,702 | 1/1966 | Small et al. | 260—93.5 |
| 3,293,211 | 12/1966 | Krimm et al. | 260—448.2 |
| 3,297,669 | 1/1967 | Harris | 260—93.5 |

JAMES A. SEIDLECK, Primary Examiner

U.S. Cl. X.R.

252—426; 260—83.7, 85.5 N, 86.7, 87.5 SC, 91.5, 93.5 R, 93.5 W, 448.2 R